(12) United States Patent
Goto (10) Patent No.: US 7,986,139 B2
(45) Date of Patent: Jul. 26, 2011

(54) POSITION SENSOR HAVING STACKED FLAT COILS

(75) Inventor: Atsutoshi Goto, Fuchu (JP)

(73) Assignee: Amiteq Co., Ltd. (JP)

( * ) Notice: Subject to any disclaimer, the term of this patent is extended or adjusted under 35 U.S.C. 154(b) by 520 days.

(21) Appl. No.: 11/993,547

(22) PCT Filed: Jun. 23, 2006

(86) PCT No.: PCT/JP2006/312636
§ 371 (c)(1),
(2), (4) Date: Jan. 24, 2008

(87) PCT Pub. No.: WO2007/000952
PCT Pub. Date: Jan. 4, 2007

(65) Prior Publication Data
US 2010/0085039 A1    Apr. 8, 2010

(30) Foreign Application Priority Data
Jun. 26, 2005  (JP) ................................. 2005-213405

(51) Int. Cl.
*G01B 7/30* (2006.01)
*H01F 5/00* (2006.01)

(52) U.S. Cl. ............................ 324/207.25; 324/207.16

(58) Field of Classification Search ............. 324/207.15, 324/207.16, 207.17, 207.24, 207.25, 207.22, 324/207.26; 336/200, 232
See application file for complete search history.

(56) References Cited

U.S. PATENT DOCUMENTS

| 4,644,570 A * | 2/1987 | Brosh et al. ..................... 377/17 |
| 6,847,284 B2 * | 1/2005 | Gamou et al. ................. 336/223 |
| 2003/0102862 A1 * | 6/2003 | Goto et al. ............... 324/207.16 |
| 2004/0085063 A1 * | 5/2004 | Jin et al. .................. 324/207.16 |
| 2006/0113991 A1 * | 6/2006 | LaClair et al. ........... 324/207.26 |

FOREIGN PATENT DOCUMENTS

| JP | 61-169715 A | 7/1986 |
| JP | 10-82608 A | 3/1998 |
| JP | 2001-141410 A | 5/2001 |
| JP | 2001-235307 A | 8/2001 |
| JP | 2001-296103 A | 10/2001 |
| JP | 2003-139812 A | 5/2003 |

OTHER PUBLICATIONS

English translation of International Search Report issued in PCT/JP2006/312636, from which this National Phase application claims priority; mailing date of Aug. 1, 2006.

* cited by examiner

*Primary Examiner* — Kenneth J Whittington
(74) *Attorney, Agent, or Firm* — Rossi, Kimms & McDowell LLP (57) ABSTRACT

A plurality of layers of flat coils are stacked and connected in series with each other to form a single coil pole, and the coil pole is energized by an A.C. signal. Magnetism-responsive member, provided to be opposed to the coil pole in a non-contact manner, is displaced relative to the coil pole, so that correspondency, to the coil section, of the magnetism-responsive member varies in response to variation in the relative position and thus impedance variation occurs in the coil pole. Position detection signal is provided on the basis of an output signal, responsive to the impedance variation, taken out from the coil pole.

10 Claims, 6 Drawing Sheets

POSITION SENSOR HAVING STACKED FLAT COILS

This application is a U.S. National Phase Application of PCT International Application PCT/JP2006/312636 filed on Jun. 23, 2006, which is based on and claims priority from JP 2005-213405 filed on Jun. 26, 2005, the contents of which are incorporated herein in its entirety by reference.

TECHNICAL FIELD

The present invention relates to a high-accuracy, non-contact type position sensor which is small in size and yet capable of producing great output levels. For example, the present invention relates to a position sensor which is suited for use as a throttle position sensor of an internal combustion engine and as a position sensor for detecting mechanical movement of a part of an automotive vehicle, and which can be used for various other applications.

BACKGROUND ART

Patent Literature 1 (Japanese Utility Model Application Laid-open Publication No. SHO-59-41708) discloses a throttle position sensor comprising a contact-sliding type variable resistor (potentiometer). Patent Literature 2 (Japanese Patent Application Laid-open Publication No. HEI-2-298802) discloses a non-contact type throttle position sensor using a magnetic resistance element. Patent Literature 3 (Japanese Patent Application Laid-open Publication No. HEI-5-26610) discloses a non-contact type throttle position sensor using a HALL element.

However, the throttle position sensor comprising a potentiometer, disclosed in Patent Literature 1, has problems related to life of use, failure and temperature drift of a resistance element because it is of a non-contact type. Further, the throttle position sensor using a magnetic resistance element, disclosed in Patent Literature 2, is problematic in terms of detection accuracy and temperature drift compensation. Furthermore, the position sensor using a HALL element, disclosed in Patent Literature 3, is disadvantageous in that it is not suited for continuous position detection. Although sheet-shaped flat coils have also been known, it has not been possible to construct a practical position sensor because sufficient inductance can not be obtained with such a sheet-shaped flat coil.

DISCLOSURE OF THE INVENTION

In view of the foregoing, it is an object of the present invention to provide a non-contact type position sensor which is small in size and yet capable of securing sufficient inductance.

In order to accomplish the above-mentioned object, the present invention provides a position sensor, which comprises: a coil section including a plurality of layers of flat coils that are stacked on each other and connected in series with each other to form a single coil pole, the coil pole being energized by an A.C. signal; and a magnetism-responsive member disposed to be opposed to the coil pole in a non-contact manner, wherein a relative position between the coil section and the magnetism-responsive member is caused to vary by displacing at least one of the coil section and the magnetism-responsive member in response to a position to be detected, correspondency, to the coil section, of the magnetism-responsive member varies in response to variation in the relative position, to cause impedance variation in the coil pole, and a position detection signal is provided on the basis of an output signal, responsive to the impedance variation, taken out from the coil pole.

According to the present invention, a plurality of layers of flat coils are stacked on each other and connected in series with each other to form a single coil pole, and thus, even through the number of turns of each of the flat coils is limited with the coil diameter of the flat coil reduced, an additive combination of the inductance of the stacked flat coils can increase the overall inductance of the entire coil pole. As a consequence, the impedance variation of the coil pole, which depends on relative positional relationship between the coil section and the magnetism-responsive member responsive to a position to be detected (object of detection), can be increased, so that the coil output signal responsive to the position to be detected can be increased in level. As a result, it is possible to achieve position detection with an increased accuracy despite a small-size/thin coil structure. Further, the use of the flat coils (printed coils) can lower the over manufacturing cost of the position sensor.

In one embodiment, the magnetism-responsive member has a limited width in a direction traversing a direction of the relative displacement, and the width has a shape gradually increasing or gradually decreasing along the direction of the relative displacement. The magnetism-responsive member is disposed so that the widest portion of the magnetism-responsive member is narrower than a width of the flat coils of the coil pole in such a manner that even the widest portion does not project beyond the width of the flat coils in the direction traversing the direction of the relative displacement. With such an arrangement, it is possible to eliminate a detection error due to assembly errors, such as a radial error, or mechanical wobble in the direction traversing the direction of the relative displacement.

In one embodiment, two magnetism-responsive members of the same construction are disposed to sandwich the coil section in an axial direction of the flat coils. With such an arrangement, it is possible to eliminate a detection error due to assembly errors, such as a thrust error, or mechanical wobble in the axial direction of the coils.

According to another aspect of the present invention, the present invention provides a position sensor, which comprises: a coil section including a plurality of layers of flat coils that are stacked on each other and connected in series with each other to form a single coil pole, the coil pole being energized by an A.C. signal; a magnetic member fixedly provided in the coil section in corresponding relation to the coil pole; and a permanent magnet disposed to be opposed to the coil pole in a non-contact manner. Relative position between the coil section and the permanent magnet is caused to vary by displacing at least one of the coil section and the permanent magnet in response to a position to be detected, correspondency, to the coil section, of the permanent magnet varies in response to variation in the relative position, to cause impedance variation in the coil pole, and a position detection signal is provided on the basis of an output signal, responsive to the impedance variation, taken out from the coil pole.

BRIEF DESCRIPTION OF DRAWINGS

FIGS. 8A and 8B show an embodiment of the present invention which employs a robust measure against both of thrust and radial errors, in which

FIGS. 9A and 9B show an example of a linear position sensor in accordance with an embodiment of the present invention, in which

FIGS. 10A and 10B show an embodiment of a rotational position sensor of the present invention employing a detection scheme based on a magnetism saturation principle, in which FIGS. 11A and 11B show an embodiment of a linear position sensor of the present invention employing a detection scheme based on a magnetism saturation principle, in which

BEST MODE FOR CARRYING OUT THE INVENTION

Figure 1A:
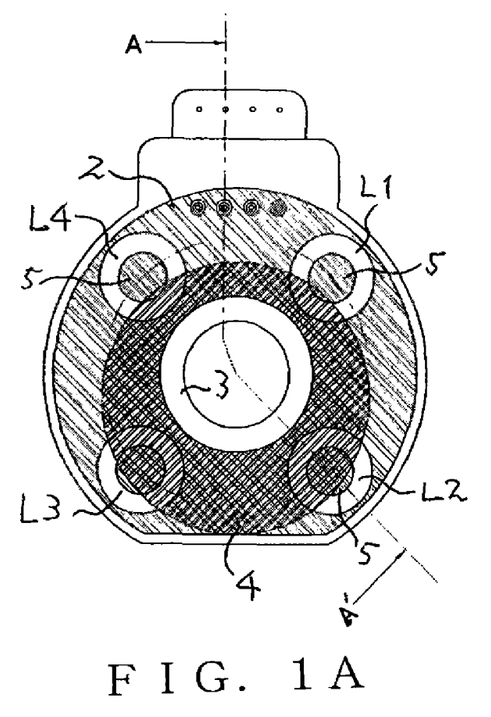
FIG. 1A is a schematic front view showing a construction of a rotary-type position sensor in accordance with an embodiment of the present invention.
Figure 1B:
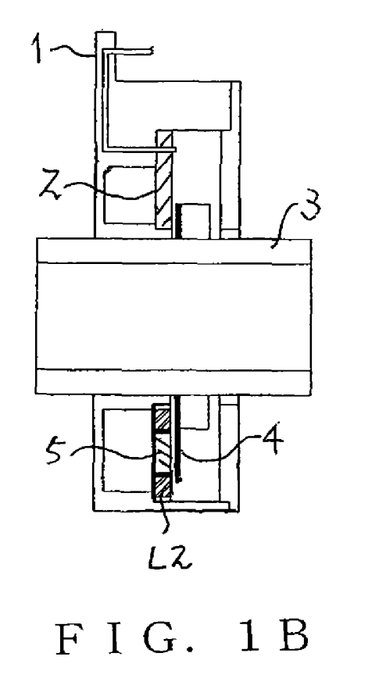
FIG. 1B is a schematic sectional view taken along the A-A' line of FIG. 1A.

FIG. 1A is a front view schematically showing a construction of a rotary-type position sensor, FIG. 1B is a schematic sectional view taken along the A-A' line of FIG. 1A. This rotary-type position sensor comprises a stator section and a rotor section. The stator section includes a coil section 2 mounted in a sensor case 1, and the rotator section includes a rotor shaft 3 rotatably mounted to the sensor case 1 and a rotor 4 that comprises a magnetism-responsive member mounted on the rotor shaft 3 so that it can be rotationally displaced together with the rotor shaft 3.

The coil section 2 includes a plurality of coil poles L1, L2, L3 and L4 disposed at predetermined intervals along the circumference of the coil section 2. In the instant embodiment, four coil poles L1, L2, L3 and L4 are provided at 90° intervals, so that rotational positions over one full rotation are detectable. However, the number and intervals of the coil poles are not so limited. In the coil section 2, each of the coil poles L1, L2, L3 and L4 is constructed of a plurality of sheet-shaped flat coils stacked in layers and interconnected in series with one another. Of course, the surfaces of the flat coils stacked in layers are electrically insulated from each other, and adjoining ones of the flat coils are interconnected only at their predetermined connection ends.

Figure 2A:
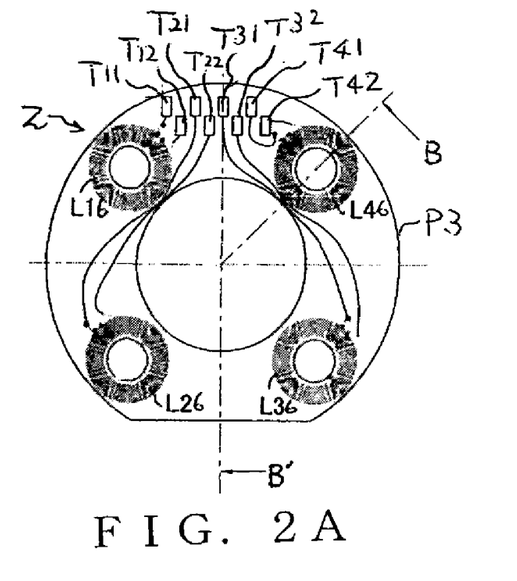
FIG. 2A is a plan view of a coil section taken from a one-side printed circuit board P3.
Figure 2B:
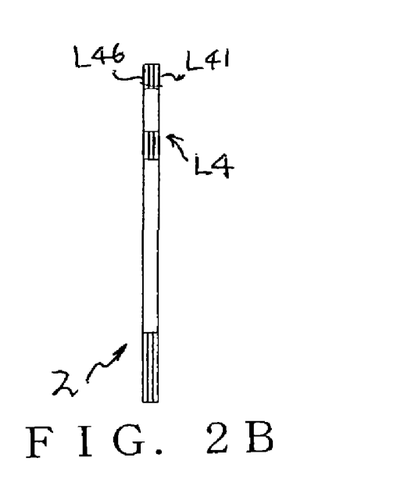
FIG. 2B is schematic sectional view taken along the B-B' line of FIG. 2A.
Figure 2C:
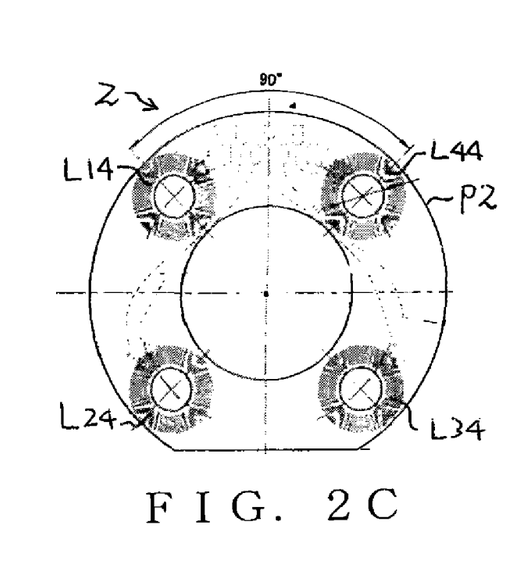
FIG. 2C is a plan view of an intermediate printed circuit board P2.
Figure 2D:
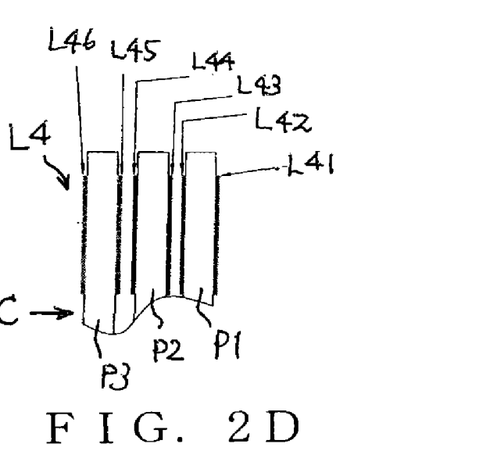
FIG. 2D is a view showing in enlarged scale a part of a flat coil portion of FIG. 2B.

FIGS. 2A-2D show a detailed example construction of the coil section 2. In the instant embodiment, the coil section 2 includes three thin sheet-shaped printed circuit boards P1, P2 and P3, and on opposite surfaces, each formed of an electrically-insulating material, of each of the printed circuit boards P1, P2 and P3, there is printed the flat coil in the form of a coil-shaped electric lead (in other words "printed coil"). Namely, the flat coil (print coil) is wound in a radial direction (i.e., in a planar direction perpendicular to a magnetic flux), not in an axial direction (magnetic flux direction). Each of the coil poles comprises a total of six serially-connected flat coils formed on the opposite surfaces of the three thin sheet-shaped printed circuit boards P1, P2 and P3, depending on the number of turns of the coil that can be wound on each planar surface of the pole. FIG. 2A is a plan view of the coil section 2 taken from the printed circuit board P3 on one side of the coil section 2, FIG. 2B is schematic sectional view taken along the B-B' line of FIG. 2A, FIG. 2C is a plan view of the intermediate printed circuit board P2, and FIG. 2D is a view showing in enlarged scale a part of the flat coil section of FIG. 2B.

On one surface of each of the printed circuit boards, as shown in FIG. 2A or 2C, there are formed flat coils L16, L26, L36 and L46, or L14, L24, L34 and L44, that are respective component elements of the four coil poles L1, L2, L3 and L4. Similarly, on the other surface of each of the printed circuit boards, there are formed flat coils that are respective component elements of the four coil poles L1, L2, L3 and L4.

FIG. 2D shows a section of one of the coil poles L4 in the coil section 2. As shown, the first-layer flat coil L41 is formed on one surface of the first printed circuit board P1 while the second-layer flat coil L42 is formed on the other surface of the first printed circuit board P1; the third-layer flat coil L43 is formed on one surface of the second printed circuit board P2 while the fourth-layer flat coil L44 is formed on the other surface of the second printed circuit board P1; and the fifth-layer flat coil L45 is formed on one surface of the third printed circuit board P3 while the sixth-layer flat coil L46 is formed on the other surface of the third printed circuit board P3. In each of the coil poles (L4 in the figure), these flat coils L41-L46 are layered or stacked coaxially as shown, and, in each of the printed circuit boards P1-P3, the flat coils have respective central openings so that magnetic cores 5 (FIG. 1) can be positioned in the respective central openings.

Figure 3A:
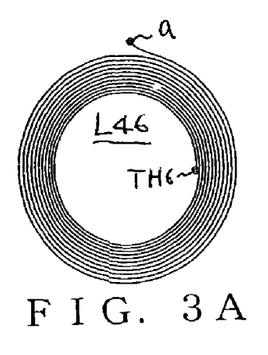
FIGS. 3A-3F are plan views of individual flat coils of a coil pole L4 taken in a direction of arrow C of FIG. 2D.
Figure 3B:
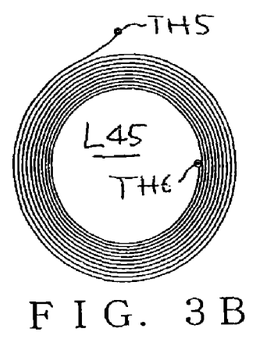

FIGS. 3A-F are plan views, taken in a direction of arrow C of FIG. 2D, showing the flat coils L41-L46 of the coil pole L4. More specifically, FIG. 3A is a plan view of the sixth-layer flat coil L46 formed on one surface of the third printed circuit board P3. On this surface of the third printed circuit board P3, there are also formed the connection terminals T11, T12, T21, T22, T31, T32, T41 and T42 of the coil poles L1-L4, as seen in FIG. 2A. Further, on this surface of the third printed circuit board P3, an outermost circumferential end a of the flat coil L46 is formed to connect to an electric line connected to the connection terminal T42. The flat coil L46 is formed in a coil shape starting at the outermost circumferential end a and coiling, in a clockwise direction in the figure, toward the center of the flat coil L46. The flat coil L46 is connected at its innermost circumferential end to a connection portion TH6 connecting with another flat coil next to the flat coil L46. The connection portion TH6 extends through the thickness of the third printed circuit board P3 to the other surface of the circuit board P3. The fifth-layer flat coil L45 is formed on the other surface of the printed circuit board P3, as shown in FIG. 3B. FIG. 3B is a plan view of the fifth-layer flat coil L45 taken from the reverse side of the printed circuit board P3 (i.e., taken in the direction of arrow C). The fifth-layer flat coil L45 is connected at its innermost circumferential end to the connection portion TH6, and it is formed in a coil shape starting at the innermost circumferential end and coiling, in the clockwise direction in the figure, toward its outer circumferential end. Thus, the flat coil 145 is serially connected in phase with the flat coil L46. The outermost circumferential end of the fifth-layer flat coil L45 is connected to a connection portion TH5. The connection portion TH5 is connected to the outermost peripheral end of the printed circuit board P2 adjoining the printed circuit board P3.

Figure 3C:
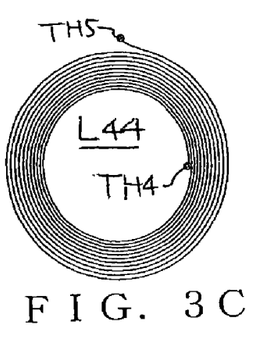
Figure 3D:
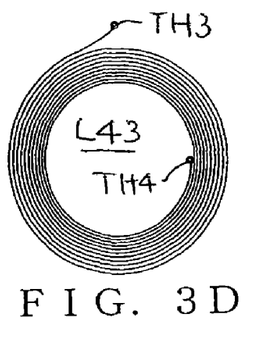

FIG. 3C is a plan view of the fourth-layer flat coil L44 formed on one surface (facing the printed circuit board P3) of the second printed circuit board P2. Coiling direction of the fourth-layer flat coil L44 is the same as that of the flat coil L46 shown in FIG. 3A; the fourth-layer flat coil L44 starts at its outermost circumferential end connected to the connection portion TH5, coils in the clockwise direction of the figure toward the center and is connected at its innermost circumferential end to a connection portion TH4. The connection portion TH4 extends through the thickness of the second printed circuit board P2 to the other surface of the circuit board P2. On the other surface of the second printed circuit board P2, there is provided the third-layer flat coil L43, as shown in FIG. 3D. Similarly to FIG. 3B, FIG. 3D is a plan view of the third-layer flat coil L43 taken from the reverse side of the printed circuit board P2 (i.e., taken in the direction of arrow C) having the flat coil L43 provided thereon. Coiling direction of the third-layer flat coil L43 is the same as that of the flat coil L45 shown in FIG. 3B; the third-layer flat coil L43 starts at its innermost circumferential end connected to the connection portion TH4 and coils in the clockwise direction of the figure toward the outermost circumference. Thus, the flat coils L46, L45, L44 and L43 are serially connected in phase with one another. The outermost circumferential end of the third-layer flat coil L43 is connected to a connection portion TH3. The connection portion TH3 is connected to an outermost peripheral end portion of the printed circuit board P1 adjoining the printed circuit board P2.

Figure 3E:
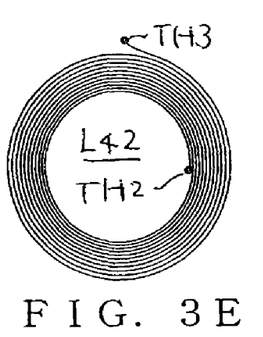
Figure 3F:
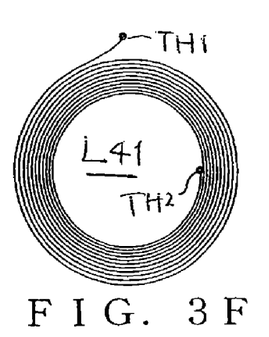

FIG. 3E is a plan view of the second-layer flat coil L42 formed on one surface (facing the printed circuit board P2) of the first printed circuit board P1. Coiling direction of the second-layer flat coil L42 is the same as that of the flat coil L46 shown in FIG. 3A; the second-layer flat coil L42 starts at its outermost circumferential end connected to the connection portion TH3, coils in the clockwise direction of the figure toward the center and is connected at its innermost circumferential end to a connection portion TH2. The connection portion TH2 extends through the thickness of the first printed circuit board P1 to the other surface of the circuit board P1. On the other surface of the first printed circuit board P1, there is provided the first-layer flat coil L41, as shown in FIG. 3F. FIG. 3F is also a plan view, similarly to FIG. 3B, of the first-layer flat coil L41 taken from the reverse side of the printed circuit board P1 (i.e., taken in the direction of arrow C) having the flat coil L41 provided thereon. Coiling direction of the first-layer flat coil L41 is the same as that of the flat coil L45 shown in FIG. 3B; the first-layer flat coil L41 starts at its innermost circumferential end connected to the connection portion TH2 and coils in the clockwise direction of the figure toward the outermost circumference. The outermost circumferential end is connected to the connection portion TH1. Thus, all of the flat coils L46, L45, L44, L43, L42 and L41 are serially connected in phase with one another. With the six layered flat coils L41-L46 serially connected in phase with one another to form one coil pole L4 in the above-described manner, it is possible to secure a necessary sufficient number of turns as a whole even though the number of turns of each of the flat coils is kept small because of the request that the coil diameter be minimized for the downsizing purpose. As a result, it is possible to increase (make sufficient) the inductance (impedance) of the coil pole L4 despite its ultra-thin/small-size coil structure. The connection portion TH1 extends through the individual printed circuit boards P1, P2 and P3 to appear on one surface of the third printed circuit board P3 and connects to a line connected to the connection terminal T41 disposed on the one surface of the circuit board P3. In this manner, the connection terminals T41 and T42 at the opposite ends of the coil pole L4 are disposed on the same surface of the third printed circuit board P3.

Figure 4:
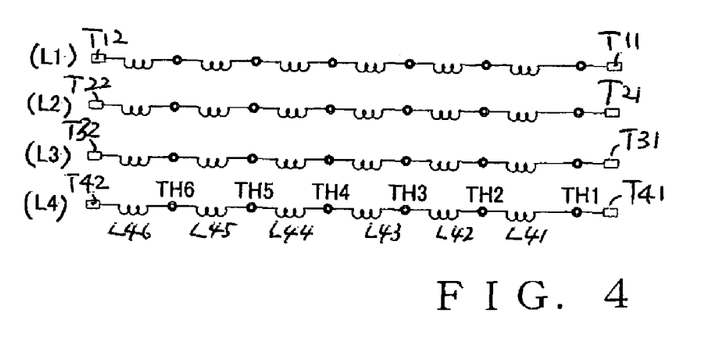
FIG. 4 is a circuit diagram showing how the individual flat coils of each of the coil poles are electrically connected.

Similarly to the coil pole L4 explained above in relation to FIGS. 3A-3F, each of the other coil poles L1, L2 and L3 is constructed of six layers of flat coils serially connected in phase with one another, and thus, it is possible to increase (make sufficient) the inductance (impedance) of the coil pole despite its ultra-thin/small-size coil structure. As shown in FIG. 2A, the connection terminals T11, T12, T21, T22, T31, T32, T41, T42 at the opposite ends of each of the coil poles L1-L4 are disposed on the same surface of the third printed circuit board P3. FIG. 4 is a diagram showing how the flat coils of each of the coil poles L1-L4 are electrically connected, which particularly shows that the individual flat coils are serially connected in phase with one another in each of the coil poles L1-L4. As shown in FIG. 1, an opening may be formed in the inner regions of the flat coils of each of the coil poles L1-L4, and the magnetic core 5 made of an amorphous metal or the like may be provided in each of the openings, although such a magnetic core 5 is not necessarily essential and may be dispensed with.

The rotor 4 mounted on the rotor shaft 3 is in the form of a magnetism-responsive member (magnetic substance like iron, or good conductive substance like copper). The rotor 4 is shaped in such a manner that its magnetism-responsive characteristic acting on each of the coil poles of the coil section 2 varies in accordance with a rotational position of the rotor 3; in the illustrated example of FIG. 1, the rotor 4 has an eccentric disk shape. The coil section 2 and the rotor 4 are positioned with a gap of a predetermined distance therebetween, so that the rotor 4 can rotate without contacting the coil section 2. The coil section 2 and the rotor 4 are positioned appropriately so that the gap distance therebetween can be kept constant. As known in the field of this type of sensor, portions of the magnetism-responsive member of the rotor 4 opposed to the individual coil poles L1-L4 of the coil section 2 vary (gradually increase or decrease) in area, due to an eccentric shape of the coil section 2, in response to rotational displacement of the rotor shaft 3, so that variable magnetic resistance corresponding to the area of the opposed portion is produced in each of the coil poles L1-L4 and thus the inductance (impedance) of each of the coil poles L1-L4 varies.

In the illustrated example of FIG. 1, the shape of the rotor 4 presents a one-cycle change per rotation of the rotor shaft 3, and the coil poles L1-L4 of the coil section 2 are arranged at mechanical 90° (quarter-cycle) intervals along the rotational circumferential direction. With such positional arrangement, respective magnetic resistance variation characteristics, responsive to a rotational position of the rotor 4, of the coil poles L1 and L3 opposed to each other by 180 degrees (i.e., arranged at a half-cycle interval) vary with opposite (i.e., push-pull) characteristics. If the resistance variation characteristic, responsive to the rotational position $\theta$ of the rotor 4, of the coil pole L1 is represented by a sine function $\sin \theta$, the resistance variation characteristic, responsive to a rotational position $\theta$ of the rotor 4, of the coil pole L3 can be represented by a minus sine function $-\sin \theta$. The coil poles L1 and L3 constitute a pair (of sine function characteristics) that presents impedance characteristics varying with a push-pull characteristic responsive to the rotational position θ to be detected.

Further, a magnetic resistance variation characteristic, responsive to the rotational position of the rotor 4, of the coil pole L2 is displaced from that of the coil pole L1 by 90° (quarter cycle), and thus, it can be represented by a cosine function cos θ. Further, a magnetic resistance variation characteristic, responsive to the rotational position of the rotor 4, of the coil pole L4 opposed to the coil L2 by 180 degrees (i.e., positioned at a half-cycle interval from the coil L2) varies with an opposite (i.e., push-pull) characteristic from the coil L2, and it can be represented by a minus cosine function −cos θ. The coil poles L2 and L4 constitute a pair (of cosine function characteristics) that presents an impedance characteristic varying with a push-pull characteristic responsive to the rotational position θ to be detected.

By appropriately setting the shape of the rotor 4, the magnetic resistance variation characteristic, responsive to the rotational position θ of the rotor 4, of the coil pole L1 can be caused to be an exact sine function sin θ; however, it is not necessarily essential to do so, and it is only necessary that the magnetic resistance variation characteristic of the coil pole L1 be close to a substantial sine function or in short a periodic function (the same can be said for the other coil poles L2-L4).

Figure 5:
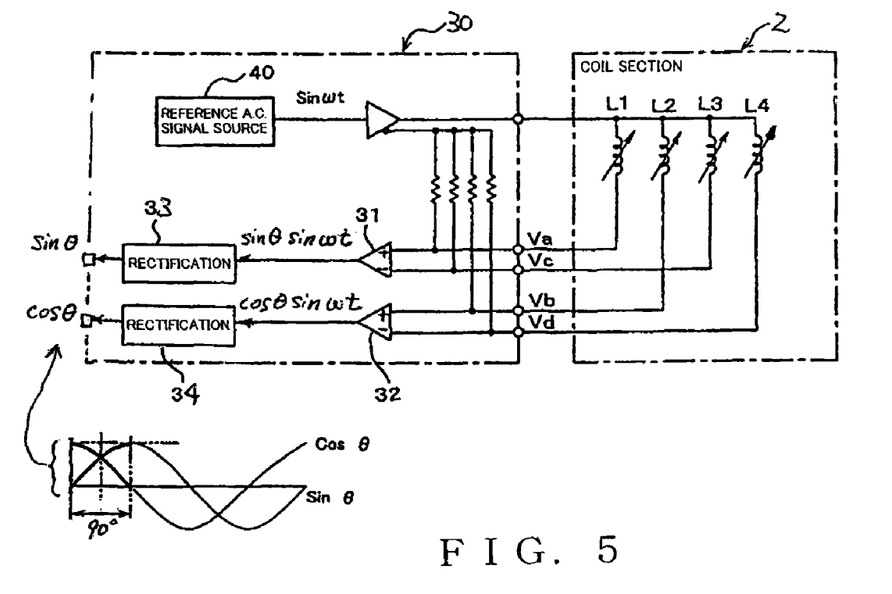
FIG. 5 is a diagram showing an example circuit construction applicable to the position sensor shown in FIG. 1.

FIG. 5 shows an example construction of a measuring circuit 30 applied to the position sensor shown in FIG. 1. This measuring circuit 30 is disposed in an appropriate position within the sensor case 1; for example, it is preferable that the measuring circuit 30 be provided on the circuit board of the coil section 2 and mechanically integrated with the inventive position sensor. In FIG. 5, each of the coil poles L1-L4 is shown equivalently as a variable inductance element. The coil poles L1-L4 are energized in a single phase by a predetermined high-frequency A.C. signal (for convenience sake, indicated by sin ωt) supplied from a reference A.C. signal source 40. Voltages Va, Vb, Vc and Vd that are produced in the coil poles L1-L4, respectively, equivalently present intensity corresponding to the impedance values, i.e. the above-mentioned magnetic resistance variation characteristics sin θ, cos θ, −sin θ and −cos θ, of the coil poles L1-L4 responsive to an angular variable θ corresponding to a rotational position to be detected.

Analog arithmetic operator 31 calculates a difference "Va−Vc" between the output voltage Va of the coil pole L1 representing the sine phase and the output voltage Vc of the coil pole L3 representing the minus sine phase varying differentially, with a push-pull characteristic, relative to the output voltage Va (differential synthesis) and thereby generates an A.C. output signal having an amplitude coefficient of a sine function characteristic of the angular variable θ. The difference "Va−Vc" can be expressed equivalently as "sin θ sin ωt".

Analog arithmetic operator 32 calculates a difference "Vb−Vd" between the output voltage Va of the coil pole L2 representing the cosine phase and the output voltage Vd of the coil pole L4 representing the minus cosine phase varying differentially, with a push-pull characteristic, relative to the output voltage Vb (differential synthesis) and thereby generates an A.C. output signal having an amplitude coefficient of a cosine function characteristic of the angular variable θ. The difference "Vb−Vd" can be expressed equivalently as "cos θ sin ωt".

In this way, there can be obtained two A.C. output signals "sin θ sin ωt" and "cos θ sin ωt" having been modulated in amplitude with two periodic amplitude functions (sin θ and cos θ), respectively, that contain the angular variable θ correlating to a relative rotational position to be detected. The thus-obtained A.C. output signals are similar to a sine-phase output signal "sin θ sin ωt" and cosine-phase output signal "cos θ sin ωt" produced by a conventional detector commonly known as a resolver. Note that the designations "sine phase" and "cosine phase" and the representations of the amplitude functions "sine" and "cosine" of the two A.C. output signals are just for illustrative purposes and the "sine" and "cosine" may be replaced with "cosine" and "sine", respectively, as necessary; namely, it is only necessary that one of the amplitude functions of the two A.C. output signals be "sine" and the other amplitude function be "cosine".

Because the respective A.C. output signals generated by the analog arithmetic operators 31 and 32 have an amplitude coefficient or amplitude level of a sine function characteristic (sin θ) and an amplitude coefficient or amplitude level of a cosine function characteristic (cos θ), respectively, any desired one of the conventionally-known position conversion schemes applicable thereto may be used to provide position data. Among examples of such conventionally-known position conversion schemes are a voltage rectification (D.C. voltage output) scheme, phase detection scheme, PWM conversion scheme, etc. Arrangement may be made such that A.C. output signals "sin θ sin ωt" and "cos θ sin ωt" produced from the analog arithmetic operators 31 and 32 are output from the measuring circuit 30, belonging to the position sensor, as output signals of the position sensor and then an external device (such as a microcomputer) receives the output signals and acquires therefrom position data in accordance with a desired position data conversion scheme employed in the external device (such as a microcomputer). Alternatively, the sensor-side measuring circuit 30 may further include an appropriate circuit for processing the outputs from the analog arithmetic operators 31 and 32 into signals suited to the desired position data conversion scheme. For example, the technique disclosed in Japanese Patent Application Laid-open Publication No. HEI-9-126809 may be employed as the above-mentioned phase detection scheme. Further, the technique disclosed in Japanese Patent Application Laid-open Publication No. 2000-55235, for example, may be employed as the above-mentioned PWM conversion scheme.

In the illustrated example of FIG. 5, the voltage rectification scheme is employed. Namely, the A.C. output signals from the analog arithmetic operators 31 and 32 are rectified, via corresponding rectification circuits, to remove respective A.C. components, so that D.C. voltages presenting the amplitude levels sin θ and cos θ are output. In this case, D.C. voltages where θ presenting amplitude levels in a range of 0-90 degrees can be used as detection signals. As additionally shown in FIG. 5, detection output signals of the sine phase sin θ and cosine phase cos θ present opposite characteristics in the 0-90 degree range. In this case, the external device (such as a microcomputer) only need to use, as position detection data, either one of the D.C. voltage outputs of the sine and cosine phases (sin θ or cos θ). However, it has been known that the capability to output such two types of position detection data of opposite characteristics is preferable in terms of anti-failure measures because such capability achieves redundancy. Of course, the external device may either use the received analog D.C. voltage signals as-is for purposes of control etc., or use the received analog D.C. voltage signals for purposes of control etc. after converting the signals into digital data. Note that the output level characteristic need not necessarily be a curve indicative of an accurate amplitude level of the sine or cosine function in the range of 0-90 degrees and may be a linear characteristic; in essence, the output level characteristic may be one that varies from a minimum value to a maximum value, or from a maximum value to a minimum value.

Although the D.C. voltage output scheme shown in FIG. 5 permits the position detection only within the range of 0-90 degrees, it is applicable to cases where an object of detection only shows variation below 90 degrees without showing variation of one full rotation. Further, even with an object of detection showing a variation in a range of 90 degrees to one full rotation (360 degrees), it is only necessary that the positional arrangement of the individual coil poles L1-L4 and the shape of the rotor 4 be set different from those shown in FIG. 1 in such a manner that the electrical angle θ of sin θ and cos θ shows a variation characteristic from 90 degrees to 360 degrees with respect to a necessary angular range of the object of detection.

Explaining now compensation of temperature drift characteristics, the impedance of the individual coil poles L1 to L4 varies in response to an ambient temperature, so that the output voltages Va to Vd of the coils also vary. However, because each of the pairs of the output voltages, varying in the push-pull fashion, are subjected to differential arithmetic synthesis to thereby provide output A.C. signals sin θ sin ωt and cos θ sin ωt of sine and cosine function characteristics, temperature drift errors of the coils are completely compensated for, and thus, influences of the impedance variation due to temperature drifts can be forestalled.

In the illustrated example of FIG. 1, the flat coils of the coil section 2 are provided so that one flat coil layer is provided on each surface of each of the printed circuit boards P1-P3. However, the present invention is not so limited, and a plurality of flat coil layers may be formed on one surface of each of conventionally-known multi-layer printed circuit boards. Of course, the number of the flat coil layers to be stacked to constitute a single pole is not limited to six layers. For example, there may be provided a coil section 2 which comprises a total of four layers of flat coils (printed coils) using only one multi-layer printed circuit board on which two layers of printed circuits can be formed on each of the two surfaces. If such a multi-layer printed circuit board fabrication technique is used to form a plurality of layers of flat coil (printed coil) patterns on a printed circuit board, the step of building layers of a plurality of flat coils stacked in a predetermined arrangement can be automatized rather than being performed manually, as a result of which the coil section 2 can be made and provided in an extremely-simplified manner.

The following paragraphs describe an inventive arrangement for enhancing the output levels of the individual coil poles L1-L4 in the coil section 2.

Figure 6:
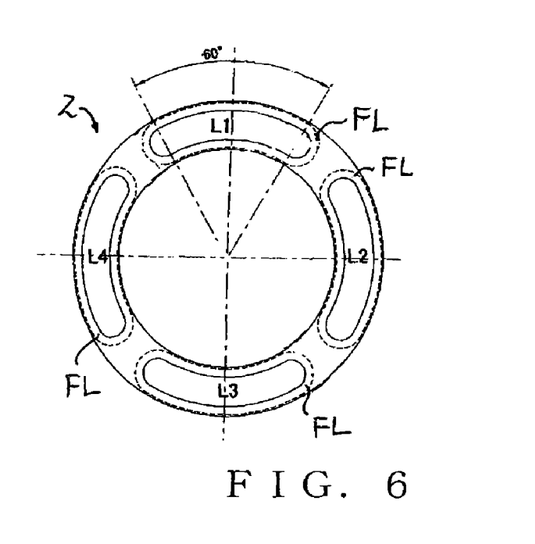
FIG. 6 is a plan view showing another example of positional arrangement of the individual coil poles in the coil section.

FIG. 6 is a plan view showing another example of the positional arrangement of the individual coil poles L1-L4 in the coil section 2. In this example, each of 1 flat coil (printed coil) layers FL of each pole is wound not in a perfect circle, but in an elliptical circle curved, along the circumference of the coil section 2, over a mechanical angle range of less than about 90 degrees. With this arrangement, the magnetic flux produced in each of the coil poles L1-L4 can be increased, and thus, the output levels of the individual coil poles L1-L4 can be enhanced.

Figure 7:
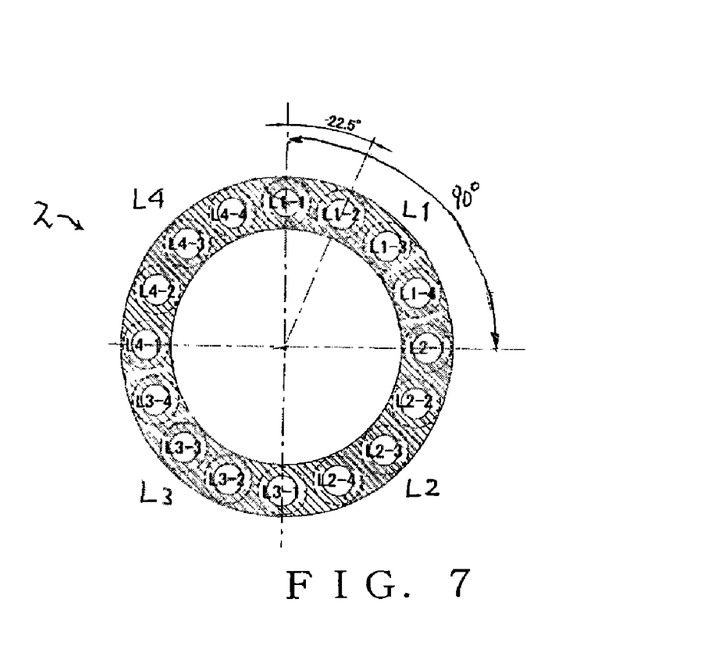
FIG. 7 a plan view showing still another example of the positional arrangement of the individual coil poles in the coil section.

FIG. 7 a plan view showing still another example of the positional arrangement of the individual coil poles L1-L4 in the coil section 2. In this example, each flat coil layer in each of the coil poles L1-L4 comprises a plurality of flat coils (printed coils). In the pole L1, for example, four flat coils (printed coils) L1-1, L1-2, L1-3 and L1-4 are arranged per layer, over a mechanical angle range of less than about 90 degrees. In this case, the flat coils (printed coils) of each of the layers are connected in series with one another, and the serially-connected outputs of the individual flat coils (printed coils) of the same pole are connected in series or added to provide a single output of that pole. In this way, the output levels of the individual coil poles L1-L4 can be enhanced.

The following paragraphs describe a robust measure employed in the instant embodiment.

In order to maintain a desired detection accuracy, it is required that the relative positional relationship between the coil section 2 and the rotor 4 vary depending only on variation in a position to be detected. However, it is possible that the relative positional relationship between the coil section 2 and the rotor 4 may be somewhat displaced in a thrust direction or radial direction of the rotor shaft 3 due to assembly errors, mechanical wobble, etc. during rotation. In such a case, the gap between the coil poles L1-L4 and the magnetism-responsive member of the rotor 4 would vary (thrust error), and the area of the mutually-opposed portions of the coil poles L1-L4 and the rotor 4 would vary (radial error) (without depending on the position to be detected). Such thrust and radial errors would result in a position detection error. Thus, the present invention proposes an epoch-making construction which can readily absorb such errors.

Figure 8A:
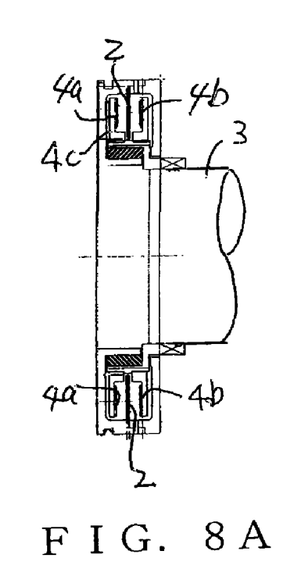
FIG. 8A is a schematic radial sectional view and FIG. 8B is a schematic front view showing an example pattern of a magnetism-responsive member of a rotor.
Figure 8B:
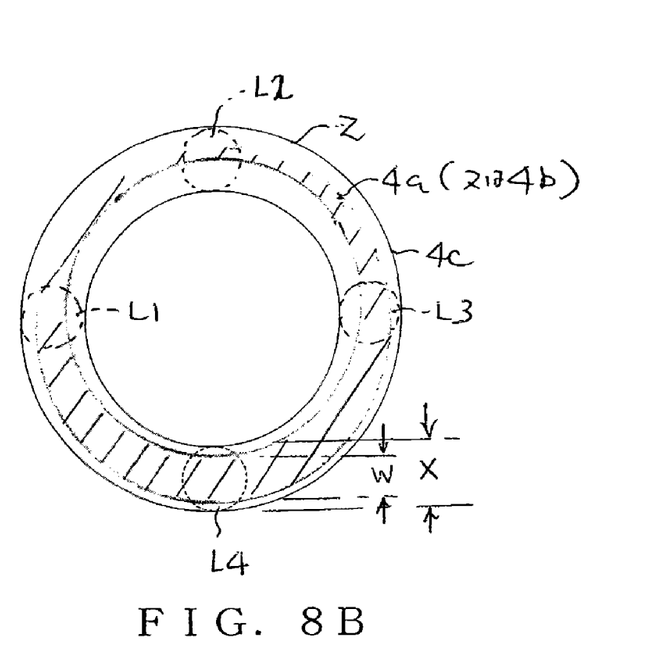

FIGS. 8A and 8B show an embodiment of the present invention which employs a robust measure against both of such thrust and radial errors.

FIG. 8A is a schematic radial sectional view, and FIG. 8B is a schematic front view showing an example pattern construction of the magnetism-responsive member of the rotor 4. In FIGS. 8A and 8B, the coil section 2 includes coil poles L1-L4 each comprising a plurality of flat coil (printed coil) layers formed in a stacked configuration, and two rotors 4a and 4b of a same construction are disposed on opposite sides of the coil section 2 in such a manner as to axially sandwich therebetween the coil section 2. Each of the rotors 4a and 4b is coupled to the rotor shaft 3 for rotation therewith.

Explaining first a radial error measure, the rotor 4a includes a magnetism-responsive member (magnetic substance or conductive substance) of a predetermined shape pattern disposed on a non-magnetism-responsive (non-magnetic or non-conductive) rotor base 4c, as shown in FIG. 8B. Basically, the shape pattern of the rotor 4a constitutes a shape such that its magnetism-responsive characteristic acting on each of the coil poles of the coil section 2 varies in accordance with a rotational position of the rotor 3 (i.e., gradually increases or decreases along a direction of displacement of a position to be detected), in a similar manner to the rotor 4 shown in FIG. 1. The rotor 4a has an eccentric ring shape having not only an eccentric-circular outer profile but also an eccentric-circular inner opening. The eccentric ring shape of the rotor 4a in the form of the magnetism-responsive member is disposed in such a manner that even a widest portion W of the rotor 4a does not project beyond a radial length X of the flat coil of the coil pole opposed thereto (e.g., coil pole L4 in the figure). In other words, the eccentric ring shape of the rotor 4a in the form of the magnetism-responsive member has a limited width in a direction (i.e., radial direction) traversing the displacement direction of the object of detection, and the limited width gradually increases or decreases along the displacement direction of the object of detection (i.e., along the circumferential direction). Further, the rotor 4a is disposed in such a manner that even the widest portion W of the magnetism-responsive member 4a does not project beyond (or is narrower than) the width X of the flat coil of the coil pole in the direction (i.e., radial direction) traversing the displacement direction of the object of detection. Thus, even when the relative positional relationship between the coil section 2 and the rotor 4a has been somewhat displaced in the radial direction of the rotor shaft 3 due to assembly errors, mechanical wobble, etc. during rotation, any portion of the rotor 4a does not project beyond the radial width of the flat coil of the coil section 2 opposed to the rotor 4a, and thus, the area of the mutually-opposed portions of the flat coil and the rotor 4a can be prevented from varying due to a radial error. In this way, any radial error, i.e. any error caused in the direction traversing the displacement direction of the object of detection can be absorbed and eliminated. Note that the other rotor 4b is constructed similarly to the rotor 4a so as to eliminate any radial error.

Explaining next a thrust error measure employed in the instant embodiment, two rotors 4a and 4b of a same construction are disposed on opposite sides of the coil section 2 in such a manner as to axially sandwich therebetween the coil section 2, as shown in FIG. 8A. Thus, even when the relative positional relationship between the coil section 2 and the rotors 4a and 4b has been somewhat displaced in the axial direction of the rotor shaft 3 due to assembly errors, mechanical wobble, etc. during rotation, the air gap between the coil section 2 and the rotor 4a and the air gap between the coil section 2 and the rotor 4b vary in a push-pull fashion. Thus, no air gap variation occurs as a whole, so that no magnetic characteristic (magnetic resistance) error/variation is caused in the coil section 2. In this way, any thrust error, i.e. any error due to variation in the air gaps between the coil section and the rotors can be absorbed and eliminated.

In each of the aforementioned embodiments, the coil section 2 may include only one pair of coil poles (e.g., L1 and L3). In such a case, the rotational-position-detectable range is a limited range of, for example, about 90 degrees, and output signals, having output level characteristics gradually increasing (or gradually decreasing) in response to a to-be-detected position over the limited range of about 90 degrees, can be obtained as push-pull, differentially-synthesized output signals. In another alternative, the coil section 2 may include only one coil pole (e.g., L1). In such a case too, the rotational-position-detectable range is a limited range of, for example, about 90 degrees, and an output signal, having an output level characteristic gradually increasing (or gradually decreasing) in response to a to-be-detected position over the limited range of about 90 degrees, can be obtained. However, in the case where only one coil pole is provided, a temperature drift compensation effect based on push-pull characteristics can not of course be attained.

Figures 9A, 9B:
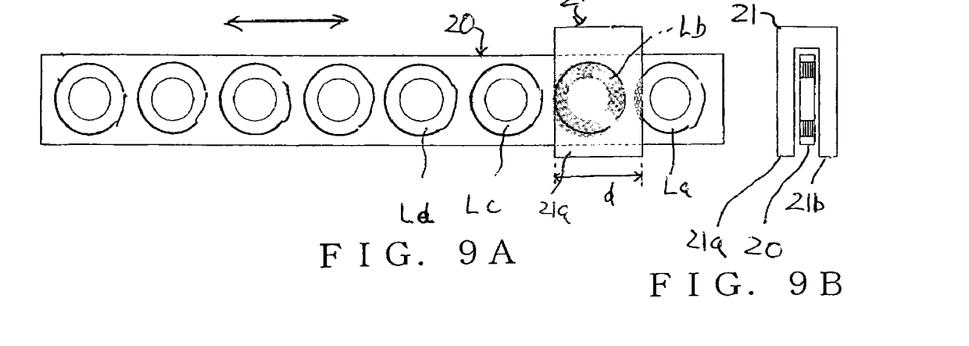
FIG. 9A is a schematic front view of the linear position sensor and FIG. 9B is a schematic side view of the linear position sensor.

Whereas the foregoing have described the present invention as applied to a rotational position sensor, the present invention is also applicable to a linear position sensor. FIGS. 9A and 9B show an example of such a linear position sensor, in which FIG. 9A is a schematic front view of the linear position sensor and FIG. 9B is a schematic side view of the linear position sensor. The coil section 20 and magnetism-responsive member 21 are provided to linearly move relative to each other in an arrowed direction in response to linear displacement to be detected. Similarly to the above-described, the coil section 20 of FIGS. 9A and 9B includes one or more coil poles La, Lb, Lc, Ld, . . . disposed along a linear displacement direction. Each of the coil poles comprises a plurality of flat coil layers stacked and serially connected with each other. The magnetism-responsive member 21 has a predetermined length d in the linear displacement direction, and the length d corresponds, for example, to an interval between adjacent ones of the coil poles. In this case, an output signal of an output level characteristic gradually increasing or decreasing in response to a position to be detected can be obtained from each of the coil poles within a range of the distance d traversing the coil poles (La, Lb, Lc, Ld, . . . ). Further, as shown in FIG. 9B, the magnetism-responsive member 21 includes two magnetism-responsive member portions 21a and 21b disposed to sandwich the coil section 20 in an axial direction of the flat coils, to thereby eliminate a thrust error.

Figures 10A, 10B:
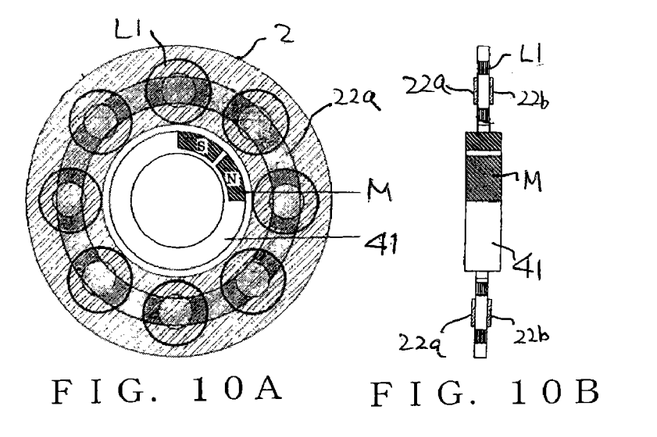
FIG. 10A is a schematic front view of the sensor and FIG. 10B is a schematic radial sectional view of the sensor.

Further, the present invention is also applicable to a detection scheme as disclosed in Japanese Patent Application Laid-open Publication No. HEI-9-318304, which is based on the magnetism saturation principle using a permanent magnetism relatively displaceable to a magnetic core of a coil. FIGS. 10A and 10B show an embodiment of a rotational position sensor of the invention employing such a detection scheme based on the magnetism saturation principle, in which FIG. 10A is a schematic front view of the sensor and FIG. 10B is a schematic radial sectional view of the sensor. Rotor 41, connected to a rotation shaft that is an object of detection, is equipped with a permanent magnet having N and S magnetic poles. Similarly to the aforementioned, the coil section 2 includes a plurality of layers of flat coils that are stacked on each other and connected in series with each other to form a single coil pole L1, and a plurality of such coil poles L1 are provided along a rotational circumferential direction. Magnetic portions 22a and 22b are provided on the opposite surfaces of the coil section 2 in corresponding relation to the coil poles. With the provision of the magnetic portions 22a and 22b, each of the coil poles L1 presents great inductance (impedance) unless the permanent magnet approaches, but, as the permanent magnet M approaches in accordance with a rotational position of the rotor 41, magnetic saturation (oversaturation) occurs, so that the inductance (impedance) lowers. Thus, an output signal of a level corresponding to a rotational position of the rotor 41 is produced in each of the coil poles L1.

Figures 11A, 11B:
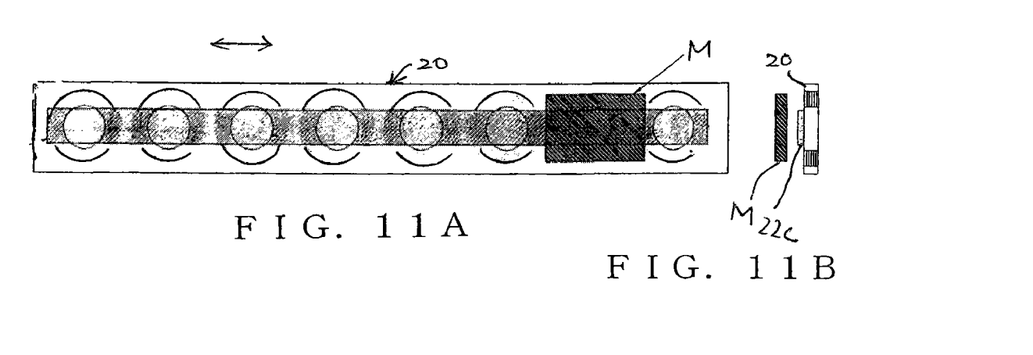
FIG. 11A is a schematic front view of the sensor and FIG. 11B is a schematic side view of the sensor

FIGS. 11A and 11B show an embodiment of a linear position sensor of the invention employing such a detection scheme based on the magnetism saturation principle, of which FIG. 11A is a schematic front view of the sensor and FIG. 11B is a schematic side view of the sensor. Similarly to the aforementioned, the coil section 20 includes a plurality of layers of flat coils that are stacked on each other and connected in series with each other to form a single coil pole, and one or more such coil poles are provided along a direction of linear displacement. Magnetic portions 22c are provided on one surface of the coil section 20 in corresponding relation to the coil poles. The coil section 20 and magnetic magnet M are provided to move linearly relative to each other in an arrowed direction in response to linear displacement of a position to be detected. In this case too, with the provision of the magnetic portions 22c, each of the coil poles L1 presents great inductance (impedance) unless the permanent magnet M approaches, but, as the permanent magnet M approaches, magnetic saturation (oversaturation) occurs, so that the inductance (impedance) lowers. Thus, an output signal of a level corresponding to the linear position to be detected is produced in each of the coil poles.

What is claimed is:
1. A position sensor comprising:
a coil section including a plurality of layers of flat coils that are stacked on each other and connected in series with each other to form a single coil pole, the coil pole being energized by an A.C. signal; and
a magnetism-responsive member disposed to be opposed to the coil pole in a non-contact manner,
wherein a relative position between said coil section and said magnetism-responsive member is caused to vary by displacing at least one of said coil section and said magnetism-responsive member in response to a position to be detected, correspondency, to said coil section, of said magnetism-responsive member varies in response to variation in the relative position, to cause impedance variation in the coil pole, and a position detection signal is provided on the basis of an output signal, responsive to the impedance variation, taken out from the coil pole, wherein said coil section includes a plurality of circuit boards that are stacked on each other, and the flat coils are respectively provided on surfaces of the circuit boards, and wherein a plurality of the layered flat coils are disposed in a horizontal arrangement per layer in corresponding relation to the one coil pole, and outputs of the flat coils are added together to provide an output signal of the one coil pole.

2. The position sensor as claimed in claim 1 wherein said coil section includes a plurality of the coil poles disposed along a direction of variation of the relative position corresponding to the position to be detected.

3. The position sensor as claimed in claim 2 wherein said plurality of the coil poles include two coil poles disposed to provide impedance characteristics that vary with a push-pull characteristic in response to the variation in the relative position, and outputs of the two coil poles having the push-pull characteristic are differentially synthesized to provide an output signal corresponding to the position to be detected.

4. The position sensor as claimed in claim 3 which includes at least two pairs of the coil poles having the push-pull characteristics, and wherein output signals presenting different output characteristics in response to the position to be detected are provided as a differential synthesized outputs of individual ones of the pairs.

5. The position sensor as claimed in claim 1 wherein the flat coil in each of the coil poles has a radial shape extending in a direction of variation of the relative position.

6. The position sensor as claimed in claim 1 wherein two said magnetism-responsive members of a same construction are disposed to sandwich said coil section in an axial direction of the flat coils.

7. The position sensor as claimed in claim 1 wherein said coil section is provided by printing the flat coils on a printed circuit board.

8. The position sensor as claimed in claim 7 wherein coil section is provided by forming multi-layers of two or more said flat coils on the printed circuit board.

9. The position sensor as claimed in claim 1 wherein said magnetism-responsive member has a limited width in a direction traversing a direction of the relative displacement, and the width has a shape gradually increasing or gradually decreasing along the direction of the relative displacement, and said magnetism-responsive member is disposed so that a widest portion of said magnetism-responsive member is narrower than a width of the flat coils of the coil pole in such a manner that even the widest portion does not project beyond the width of the flat coils in the direction traversing the direction of the relative displacement.

10. A position sensor comprising:

a coil section including a plurality of layers of flat coils that are stacked on each other and connected in series with each other to form a single coil pole, the coil pole being energized by an A.C. signal;

a magnetic member fixedly provided in said coil section in corresponding relation to the coil pole; and a permanent magnet disposed to be opposed to the coil pole in a non-contact manner, wherein a relative position between said coil section and said permanent magnet is caused to vary by displacing at least one of said coil section and said permanent magnet in response to a position to be detected, correspondency, to said coil section, of said permanent magnet varies in response to variation in the relative position, to cause impedance variation in the coil pole, and a position detection signal is provided on the basis of an output signal, responsive to the impedance variation, taken out from the coil pole, wherein said coil section includes a plurality of circuit boards that are stacked on each other, and the flat coils are respectively provided on surfaces of the circuit boards, and wherein a plurality of the layered flat coils are disposed in a horizontal arrangement per layer in corresponding relation to the one coil pole, and outputs of the flat coils are added together to provide an output signal of the one coil pole.

* * * * *